United States Patent [19]

Lair

[11] Patent Number: 5,390,879

[45] Date of Patent: Feb. 21, 1995

[54] JET PIPE FOR SUPPORTING A THRUST REVERSER FOR AIRCRAFT JET ENGINES

[76] Inventor: Jean-Pierre Lair, 100 W. El Prado, Suite 308, San Antonio, Tex. 78212

[21] Appl. No.: 980,170

[22] Filed: Nov. 23, 1992

[51] Int. Cl.⁶ .............................................. B64D 33/04
[52] U.S. Cl. .......................... 244/110 B; 239/265.27; 239/265.19
[58] Field of Search ............... 244/110 B; 239/265.27, 239/265.29, 265.31; 60/226.2

[56] References Cited

U.S. PATENT DOCUMENTS

| | | | |
|---|---|---|---|
| 2,975,593 | 3/1961 | Bauger et al. | 239/265.27 |
| 5,054,285 | 10/1991 | Geidel et al. | 244/110 B |
| 5,176,340 | 1/1993 | Lair | 239/265.19 |

Primary Examiner—Michael S. Huppert
Assistant Examiner—Anne Bidwell
Attorney, Agent, or Firm—Harold H. Dutton, Jr.

[57] ABSTRACT

A jet exhaust pipe for aircraft jet engines comprising a fixed structure, a pair of movable shells surrounding the gas discharge end of the fixed structure, the shells being connected to the fixed structure on opposite sides thereof, a pair of thrust reverser doors pivotally connected to the fixed structure, and an actuator for moving the thrust reverser doors and the shells between a first, non-reversing position and a second, reversing position, wherein the shells form a portion of the gas flow surface of the jet exhaust pipe in the first position, and are out of the gas flow in the second position.

9 Claims, 3 Drawing Sheets

JET PIPE FOR SUPPORTING A THRUST REVERSER FOR AIRCRAFT JET ENGINES

This invention relates to a thrust reverser for aircraft jet engines. More particularly the invention relates to a jet exhaust pipe for supporting a thrust reverser which can be used either with or without bypass of the main jet, and which is disposed downstream of the jet exhaust pipe. According to the invention, the jet exhaust pipe is formed by a fixed structure and two pivoting shells.

BACKGROUND AND OBJECTS OF THE INVENTION

In order to reduce the landing distance of a jet engine powered aircraft, as well as to increase the margin of safety when the aircraft is landing on a wet or icy runway, thrust reversers are utilized on the jet engines in order to provide a braking thrust for slowing the aircraft. Thrust reversers typically function to reverse the direction of the jet thrust, from a normally rearward direction which is used for propelling an aircraft, to a forward direction for slowing or braking the aircraft. Typically, such thrust reversers are formed by thrust reverser "doors" which are capable of pivoting between two positions about an axis which is transverse and substantially diametrical with respect to the jet of the engine.

The first position finds the doors in a stowed position, out of the direct path of the exhaust blast of the engine. In this position, the doors form the exhaust nozzle of the gas turbine engine so that the thrust of the engine is directly rearward, thereby producing the forward thrust of the aircraft. In the second position, the doors are pivoted about the pivot axis to a transverse, blast deflecting or deployed position, to intercept and redirect the jet blast, and thereby produce the braking thrust for the aircraft when needed.

The thrust reversers are generally mounted on a fixed structure called a jet exhaust pipe. This jet exhaust pipe basically serves a dual role. In the forward thrust mode of operation of the jet engine, i.e. when the reverser doors are in the stowed position, the jet exhaust pipe forms a part of the envelope of the jet flow and is intended to ensure the best possible flow continuity with the inner skin of the thrust reverser doors.

In the reverse thrust operation, i.e. when the reverser doors are deployed, the jet exhaust pipe provides the throat of the nozzle, and defines as well the spacing distance from the thrust reverser doors.

Both of these functions of the jet exhaust pipe are important criteria for the proper operation of the jet engine. While in the forward thrust mode, a good flow continuity is essential to the proper forward thrust performance. In addition, the jet exhaust pipe must adequately define the throat area in reverse and the spacing distance in order to satisfy the operational compatibility requirements of the engine and of the thrust reverser when the thrust reverser is deployed.

Experience has shown that currently, thrust reversers tend to favor more the reversing function of operation. But this, unfortunately, is at the expense of the performance provided in the forward thrust mode of operation, meaning that performance degradation in the forward thrust mode is generally associated with the installation of thrust reversers. This is an unfortunate circumstance and a significant drawback, since the thrust reversers are only used for 15 to 30 seconds of a flight.

French patent 2,348,371 and U.S. Pat. No. 4,129,269 illustrate the lack of solid wall continuity between the jet pipe and the inner skin. While these patents assert that the resulting presence of the annular space improves the positioning of the reverser doors, experience has shown that the presence of such an annular space, in the direct thrust mode, is not always beneficial, contrary to the suggestions in these patents. Only when the static pressure of the jet at the exit plane of the nozzle is less than the ambient pressure is the establishment, in operation, of a fluid wall beneficial to forward thrust performance.

Experience has also shown that the static pressure at the edge of the exhaust pipe is, in practice, always greater than the ambient pressure. In such case, the presence of an annular space is not desirable.

In other thrust reversers, the inner skin of the thrust reverser doors is shaped to fit in the stowed position in a complementary relationship with the jet exhaust pipe (U.S. Pat. No. 3,532,275). Such an arrangement is good for forward thrust performance, but is not efficient in reverse thrust performance as the reverse jet flow is not efficiently contained by the reverser doors. It is known that such reverser door configuration generates side spillages in reverse, which greatly affect the ground handling qualities of the aircraft with the reverser deployed, and also greatly reduce the decelerating force produced by the reverser.

Accordingly, a primary object of the present invention is to provide a thrust reverser which overcomes the disadvantages of known thrust reverser systems.

Another object of the invention is to provide a thrust reverser which, for forward thrust operation, does not modify the flow line of the jet of the engine. This means that when the reverser doors are stowed, the jet pipe ensures a perfect flow contour continuity with the inner skin of the reverser doors.

A further object of the invention is to provide a jet pipe which is arranged in such a manner that when the thrust reverser doors are commanded to deploy, the actuators which control the position of the reverser doors also open further the jet exhaust pipe in order to ensure proper throat area and spacing distance in reverse.

Still another object of the invention is to provide a thrust reverser capable of containing the reverse flux in order to avoid side spillages and ensure high retarding forces. According to the present invention, the flow lines of the jet exhaust pipe are completely similar to those of a non-reversing nozzle.

Although the system described in this invention can be installed on prior art thrust reversers such as those in French patent 2,348,371 or U.S. Pat. No. 4,129,269, it can also be beneficially used in combination with the invention described in copending application Ser. No. 798,213, now U.S. Pat. No. 5,176,340 issued Jan. 5, 1993, the specification of which is incorporated herein by reference, and which invention provides a planar exit nozzle.

DESCRIPTION OF THE INVENTION

The jet exhaust pipe according to the present invention comprises a fixed structure and two shells, each of which is pivotally attached to two pairs of links on opposite sides of the fixed structure of the jet pipe so as to be pivotally movable between reversing and non-reversing positions, in such a manner that in the non-reversing position, the skin of the jet pipe, the shells and the inner skin of the reverser doors form a continuation of the gas flow surface of the jet pipe, and in the reversing position, the shells are driven upstream by the control actuators of the reverser doors and positioned above (for the upper shell) and below (for the lower shell) the fixed part of the jet exhaust pipe, so as to provide proper throat area and spacing distance in reverse.

The pivotable shells provide a perfect flow contour continuity between the fixed portion of the exhaust jet pipe and the inner skin of the thrust reverser doors.

Linkage arrangements connect the shells to the fixed structure of the jet exhaust pipe, so that actuation of the reverser doors simultaneously actuates the pivoting of the shells between their respective non-reversing and reversing position, and vice-versa.

Thus, while the shells are in their non-reversing position, there is a perfect flow contour continuity between the fixed structure of the jet exhaust pipe, the shells, and the inner skin of the reverser doors, thereby ensuring the exact same flow contour as a non-reversing nozzle, and thereby avoiding performance degradation due to thrust reverser installation.

While the shells are in their reversing position, the throat area of the jet exhaust pipe and spacing distance are ensured. Also, the thrust reverser doors are able to contain the reverse flux and eliminate side spillage, which in turn contributes to providing high retarding or braking forces. The performance with respect to prior art thrust reversers is therefor improved.

DESCRIPTION OF THE DRAWINGS

The invention will now be described in greater detail with reference to the accompanying drawings, which show by way of non-limiting example, preferred features and embodiments of the invention, and in which.

DESCRIPTION OF PREFERRED EMBODIMENTS

Figure 1:
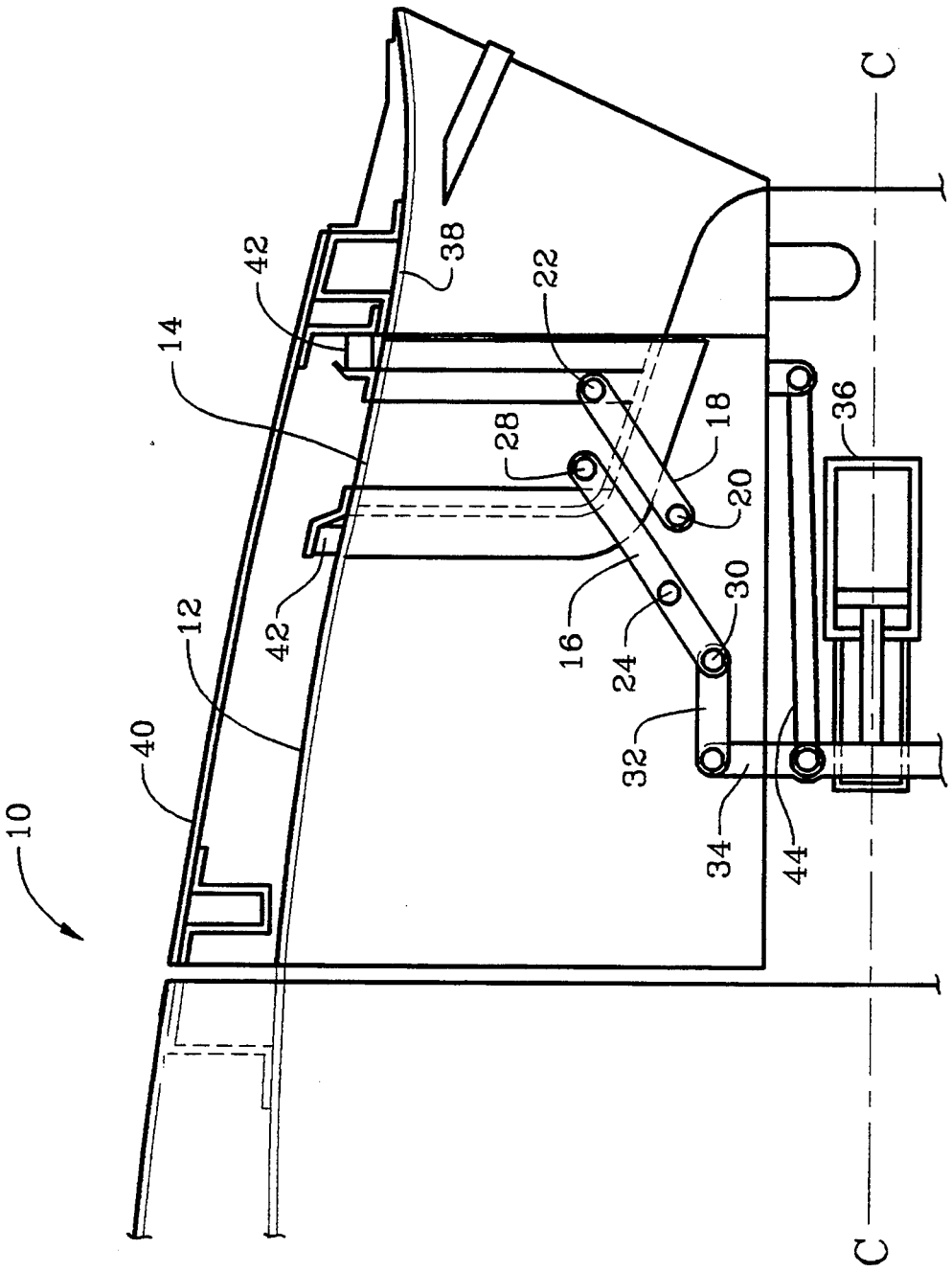
FIG. 1 is a schematic cross-sectional view of the jet exhaust pipe with the shells in their non-reversing position (thrust reverser doors are stowed)

As seen in the drawings, the jet exhaust pipe 10 of the present invention comprises a fixed structure 12 and a pair of shells 14. For the sake of clarity and simplicity, only one longitudinal half of the jet pipe is shown in the drawings. The other half is essentially symmetrical to that shown in the drawings, with the line of symmetry being the dashed line C.

With reference to FIG. 1, each shell 14 is connected for pivotal movement to two pairs of links 16 and 18. Each pair is installed on each side of the jet exhaust pipe, and each pair forms, in essence, a parallelogram linkage connection. One link 18 of each pair (and its opposite counterpart link, not shown) has one end 20 hinged to the fixed structure 12 of the jet exhaust pipe 10, while the other end 22 is hinged to the shell 14.

The other link 16 of each pair (and its opposite counterpart link, not shown) is also hinged at 24 to the fixed structure 12 of the jet exhaust pipe 10. One end of the link 16 is hinged to the shell 14 at 28, while its other end is connected at 30, through a linkage member 32, to the cross head 34 of the actuator 36. The same arrangement is provided on the side opposite to that shown.

It is important to note that the shell 14 which is shown in the non-reversing position in FIG. 1, re-establishes the perfect continuity of the profiles between the jet pipe 12 and the inner skin 38 of the thrust reverser door 40. This characteristic eliminates the undesirable annular space or cavity mentioned above with respect to the prior art.

FIG. 1 also shows the sealing member 42 arranged to provide a seal between the shell 14, the jet exhaust pipe 12 and the thrust reverser door 40. As is best seen in FIG. 2, the seal 42 is installed on the shell 14.

Figure 2:
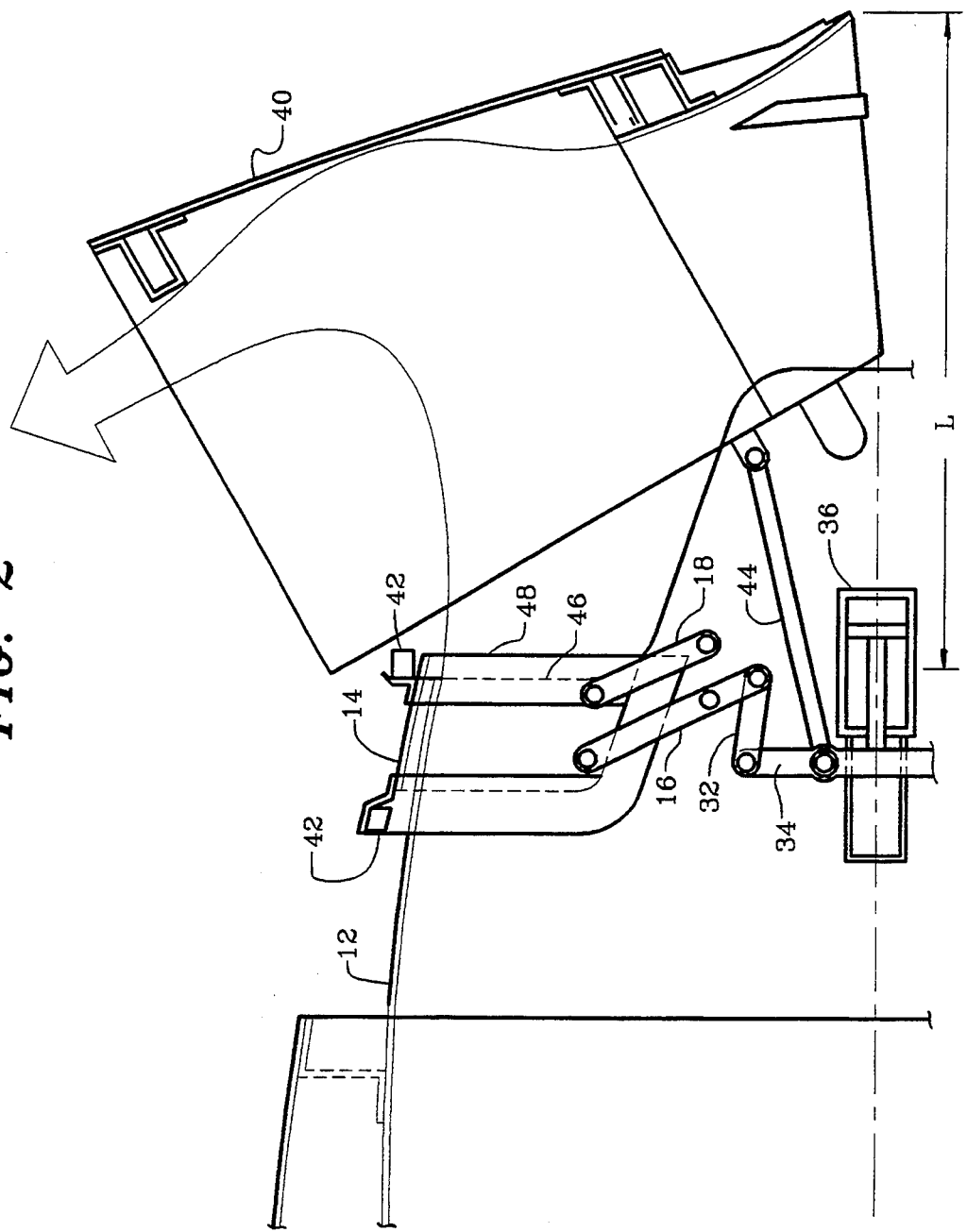
FIG. 2 is a schematic cross-sectional view of the jet exhaust pipe with the shells in their reversing position (thrust reverser doors are deployed) and FIG. 3 is a schematic side elevational view of the jet exhaust pipe.
Figure 3:
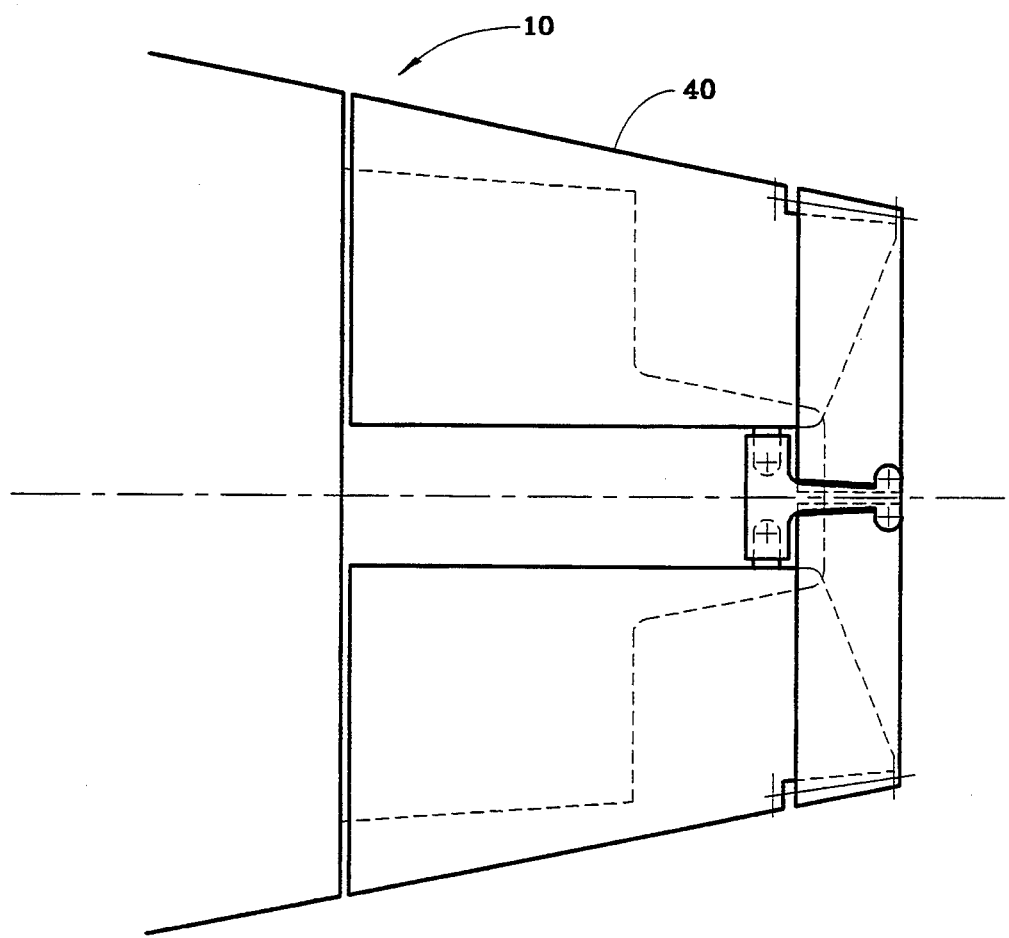

Referring to FIG. 2, the link 32 which is driven by the reverser door actuators 36 (one on each side) drives in turn the link 16. As a result of the reverser door 40 being positioned toward its reversing position by links 44, simultaneously the shell 14 is pivoted forward and above the jet pipe 12 such that the trailing edges 46 and 48 respectively of the jet pipe 12 and the shell 14 are approximately in the same plane. This characteristic assures a proper jet pipe throat area in the reverse mode (since the throat of the jet pipe, in reverse, is defined by the trailing edge 46 of the jet pipe 12). Also, the spacing distance L, which is a critical dimension for assuring that the compatibility requirements of the reverser and the engine, is re-established.

These two conditions, proper throat area of the jet pipe and proper spacing distance are also discussed above.

It will also be noted with reference to FIG. 2 that when the shell 14 is moved to its reversing position, it is not subjected to the reverse efflux of the jet. As is seen from the drawing, the reverse efflux can readily follow the contour defined by the outer skin of the thrust reverser door 40. Since there is no structure for keeping the reverse efflux away from the outer skin of the reverser door as in the prior art (for example U.S. Pat. No. 3,532,275), the thrust reverser door is capable of better containing the reverse efflux and therefor avoiding side spillages, which are the main cause of poor retarding force and ground handling difficulties of the aircraft with the reversers deployed.

While this invention has been described as having certain preferred features and embodiments, it will be understood that it is capable of still further variation and modification, without departing from the spirit of the invention. This application, therefor, is intended to cover any and all variations, modifications and adaptations of the invention which fall within the spirit of the invention and the scope of the appended claims.

I claim:

1. A jet exhaust pipe for aircraft jet engines comprising a fixed structure, a pair of shells surrounding the gas discharge end of said fixed structure, linkage means pivotally connecting each of said shells to said fixed structure on opposite sides thereof, and means for moving said shells between a first position wherein said shells forms a portion of the gas flow surface of the jet exhaust pipe, and a second position out of the gas flow, a pair of thrust reverser doors pivotally connected to said fixed structure, and means for moving said thrust reverser doors and said shells substantially simultaneously between said first position and second positions, actuator means for operating said moving means, said actuator means comprising a cross member connected to both of said moving means for simultaneously actuating both of said moving means, and said cross-member being connected to first link arms for moving said thrust reverser doors and second link arms for moving said shells.

2. A jet exhaust pipe as in claim 1 and including seal means for establishing a seal between said shells and said fixed structure when said shells are in said first position.

3. A jet exhaust pipe as in claim 1 and wherein said shells establish flow continuity between said fixed structure and said thrust reverser doors in said first position.

4. A jet exhaust pipe as in claim 1 and wherein the exit nozzle of said jet exhaust pipe is planar.

5. A jet exhaust pipe for aircraft jet engines comprising a fixed structure, a pair of movable shells surrounding the gas discharge end of said fixed structure, means connecting each of said shells to said fixed structure on opposite sides thereof, a pair of thrust reverser doors pivotally connected to said fixed structure, and means for moving said thrust reverser doors and said shells between a first, non-reversing position and a second, reversing position, wherein said shells form a portion of the gas flow surface of the jet exhaust pipe in said first position, and are out of the gas flow in said second position, said moving means comprising actuator means connected to said shells and said thrust reverser doors and including first linkage means connecting said actuator means and said shells, and second linkage means connecting said actuator means and said thrust reverser doors for actuating said shells and said thrust reverser doors substantially simultaneously.

6. A jet exhaust pipe for aircraft jet engines as in claim 5 and including parallelogram linkage means connecting said actuator means to said shells and said thrust reverser doors.

7. A jet exhaust pipe for aircraft jet engines as in claim 5 and including seal means between said shells and said fixed structure for effecting a gas flow seal therebetween.

8. A jet exhaust pipe for aircraft jet engines as in claim 5 and including seal means for providing a seal between said shells and said thrust reverser doors.

9. A jet exhaust pipe for aircraft jet engines as in claim 5 and including seal means on each of said shells for providing a seal between said shells, said jet exhaust pipe and said thrust reverser doors.

* * * * *